United States Patent
Nilsson et al.

(10) Patent No.: US 10,743,318 B2
(45) Date of Patent: Aug. 11, 2020

(54) BEAM MANAGEMENT IN A CELL

(71) Applicant: Telefonaktiebolaget LM Ericsson (publ), Stockholm (SE)

(72) Inventors: Andreas Nilsson, Göteborg (SE); Fredrik Athley, Kullavik (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/559,861

(22) PCT Filed: Sep. 1, 2017

(86) PCT No.: PCT/EP2017/072015
§ 371 (c)(1),
(2) Date: Sep. 20, 2017

(87) PCT Pub. No.: WO2019/042567
PCT Pub. Date: Mar. 7, 2019

(65) Prior Publication Data
US 2019/0075554 A1    Mar. 7, 2019

(51) Int. Cl.
*H04W 72/04* (2009.01)
*H04W 16/28* (2009.01)
*H04B 7/08* (2006.01)
*H04B 7/06* (2006.01)
*H04B 7/0408* (2017.01)

(52) U.S. Cl.
CPC ........ *H04W 72/046* (2013.01); *H04B 7/0695* (2013.01); *H04B 7/088* (2013.01); *H04W 16/28* (2013.01); *H04W 72/0433* (2013.01); *H04B 7/0408* (2013.01)

(58) Field of Classification Search
CPC .... H04W 72/046; H04W 16/28; H04B 7/088; H04B 7/0695; H04B 7/0408; H04B 7/0617
See application file for complete search history.

(56) References Cited

U.S. PATENT DOCUMENTS

2008/0165874 A1* 7/2008 Steele ................. H04L 1/0026
375/261
2009/0058725 A1* 3/2009 Barker ................ H04B 7/0408
342/372
2009/0086648 A1 4/2009 Xu et al.
(Continued)

FOREIGN PATENT DOCUMENTS

WO    2009/046409 A2    4/2009

OTHER PUBLICATIONS

International Search Report and Written Opinion dated May 18, 2018 issued in International Application No. PCT/EP2017/072015. (16 pages).
(Continued)

*Primary Examiner* — Aristocratis Fotakis
(74) *Attorney, Agent, or Firm* — Rothwell, Figg, Ernst & Manbeck, P.C.

(57) ABSTRACT

There is provided mechanisms for beam management in a cell. A method is performed by a network node. The method comprises performing a beam management procedure in a cell served by the network node. A mutually different number of antenna ports are used by the network node in each of at least two cell parts into which the cell is divided during the beam management procedure in the cell.

29 Claims, 4 Drawing Sheets

(56) References Cited

U.S. PATENT DOCUMENTS

| | | | |
|---|---|---|---|
| 2010/0091678 A1 | 4/2010 | Chen et al. | |
| 2011/0038308 A1* | 2/2011 | Song | H04B 7/0408 370/328 |
| 2011/0261773 A1* | 10/2011 | Nogami | H01Q 1/246 370/329 |
| 2013/0034000 A1* | 2/2013 | Huo | H04L 25/03343 370/252 |
| 2013/0301454 A1* | 11/2013 | Seol | H04B 7/043 370/252 |
| 2016/0105265 A1* | 4/2016 | Wang | H04L 5/0048 370/252 |
| 2016/0197661 A1* | 7/2016 | Sotek | H04B 7/0408 375/260 |
| 2018/0034516 A1* | 2/2018 | Zhang | H04B 7/04 |
| 2018/0034531 A1* | 2/2018 | Sadiq | H04W 76/10 |
| 2018/0048375 A1* | 2/2018 | Guo | H04B 7/088 |
| 2018/0102817 A1* | 4/2018 | Park | H04B 7/04 |
| 2018/0167883 A1* | 6/2018 | Guo | H04B 7/0617 |
| 2018/0198502 A1* | 7/2018 | Kim | H04B 7/046 |
| 2018/0227036 A1* | 8/2018 | Palenius | H04B 7/0808 |
| 2018/0241454 A1* | 8/2018 | Lee | H04B 7/06 |
| 2019/0037609 A1* | 1/2019 | Harada | H04W 88/02 |
| 2019/0089435 A1* | 3/2019 | Mondal | H04B 7/0695 |

OTHER PUBLICATIONS

Intel Corporation, "Further discussion on NR Type I codebook design," 3GPP Draft; R1-1700341, vol. RAN WG1, No. Spokane, USA; 20170116-20170120 (Jan. 10, 2017), XP051202819. (9 pages).
Indian Office Action dated Jun. 18, 2020 issued in Indian Patent Application No. 201747032977. (7 pages).

\* cited by examiner

BEAM MANAGEMENT IN A CELL

CROSS REFERENCE TO RELATED APPLICATION(S)

This application is a 35 U.S.C. § 371 National Stage of International Patent Application No. PCT/EP2017/072015, filed Sep. 1, 2017, designating the United States, the disclosure of which is incorporated by reference.

TECHNICAL FIELD

Embodiments presented herein relate to a method, a network node, a terminal device, computer programs, and a computer program product for beam management in a cell.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node at the network side and at the terminal devices at the user side might be required to reach a sufficient link budget.

In general terms, the use of beamforming could imply that the terminal devices will be not only operatively connected to the network node via a beam but also performs a handover between (narrow) beams instead of between network nodes of different cells, or between transmission and reception points (TRPs) of one and the same network node. At higher frequency bands high-gain beamforming with narrow beams could be used due to more challenging radio propagation properties than at lower frequency bands. Each beam will only be optimal within a small area and the link budget outside the optimal beam will deteriorate quickly. Hence, frequent and fast beam switching is needed to maintain high performance. This is hereinafter referred to as beam management. One purpose of so-called beam management is thus for the network node to keep track of its served terminal devices with narrow beams (as used at the TRP of the network node and/or at the terminal devices) in order to increase coverage and throughput.

It is expected that at least some terminal devices might be provided with two or more antenna arrays, or panels, preferably pointing in different directions, in order to improve the coverage, mitigate the risk of blockage, and increase the order of spatial multiplexing. The antenna elements of the antenna arrays can be either dual-polarized on single-polarized. For example, two one-dimensional antenna arrays might be located in different directions at a terminal device.

In case both the TRP and the terminal device have (at least) four baseband chains (for example, two dual-polarized antenna arrays each), up to four-layer transmission will be possible between them. However, it could be that the radio propagation channel between the TRP and the terminal device has a channel rank that supports less than four-layer transmission. It would therefore be unnecessary, or a waste of resources, to use four antenna ports transmission for the beam management in this case.

Hence, there is a need for mechanisms for efficient determination of how many layers to use for the transmission during beam management in the cell.

SUMMARY

An object of embodiments herein is to provide efficient beam management in a cell.

According to a first aspect there is presented a method for beam management in a cell. The method is performed by a network node. The method comprises performing a beam management procedure in a cell served by the network node. A mutually different number of antenna ports are used by the network node in each of at least two cell parts into which the cell is divided during the beam management procedure in the cell.

According to a second aspect there is presented a network node for beam management in a cell. The network node comprises processing circuitry. The processing circuitry is configured to cause the network node to perform a beam management procedure in a cell served by the network node. A mutually different number of antenna ports are used by the network node in each of at least two cell parts into which the cell is divided during the beam management procedure in the cell.

According to a third aspect there is presented a network node for beam management in a cell. The network node comprises processing circuitry and a storage medium. The storage medium stores instructions that, when executed by the processing circuitry, cause the network node to perform a beam management procedure in a cell served by the network node. A mutually different number of antenna ports are used by the network node in each of at least two cell parts into which the cell is divided during the beam management procedure in the cell.

According to a fourth aspect there is presented a network node for beam management in a cell. The network node comprises a beam management module configured to perform a beam management procedure in a cell served by the network node. A mutually different number of antenna ports are used by the network node in each of at least two cell parts into which the cell is divided during the beam management procedure in the cell.

According to a fifth aspect there is presented a computer program for beam management in a cell. The computer program comprises computer program code which, when run on processing circuitry of a network node, causes the network node to perform a method according to the first aspect.

According to a sixth aspect there is presented a method for beam management in a cell. The method is performed by a terminal device. The method comprises performing a beam management procedure in a cell served by a network node. A mutually different number of antenna ports are used by the network node in each of at least two cell parts into which the cell is divided during the beam management procedure in the cell, such that from how many antenna ports at the network node the terminal device receives reference signals during the beam management procedure depends on in which of the at least two cell parts the terminal device is located during the beam management procedure.

According to a seventh aspect there is presented a terminal device for beam management in a cell. The terminal device comprises processing circuitry. The processing circuitry is configured to cause the terminal device to perform a beam management procedure in a cell served by a network node. A mutually different number of antenna ports are used by the network node in each of at least two cell parts into which the cell is divided during the beam management procedure in the cell, such that from how many antenna ports at the network node the terminal device receives reference signals during the beam management procedure depends on in which of the at least two cell parts the terminal device is located during the beam management procedure.

According to an eighth aspect there is presented a terminal device for beam management in a cell. The terminal device comprises processing circuitry and a storage medium. The storage medium stores instructions that, when executed by the processing circuitry, cause the terminal device to perform a beam management procedure in a cell served by a network node. A mutually different number of antenna ports are used by the network node in each of at least two cell parts into which the cell is divided during the beam management procedure in the cell, such that from how many antenna ports at the network node the terminal device receives reference signals during the beam management procedure depends on in which of the at least two cell parts the terminal device is located during the beam management procedure.

According to a ninth aspect there is presented a terminal device for beam management in a cell. The terminal device comprises a beam management module configured to perform a beam management procedure in a cell served by a network node. A mutually different number of antenna ports are used by the network node in each of at least two cell parts into which the cell is divided during the beam management procedure in the cell, such that from how many antenna ports at the network node the terminal device receives reference signals during the beam management procedure depends on in which of the at least two cell parts the terminal device is located during the beam management procedure.

According to a tenth aspect there is presented a computer program for beam management in a cell, the computer program comprising computer program code which, when run on processing circuitry of a terminal device, causes the terminal device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these network nodes, these terminal devices, and these computer programs provide efficient beam management in the cell.

Advantageously these methods, these network nodes, these terminal devices, and these computer programs define how many antenna ports to use for the transmission in each cell part during the beam management procedure.

Advantageously, the number of antenna ports for the beam management procedure can be adapted to the need.

Advantageously, this will reduce the overhead compared to assuming the same, high, channel rank for the beam management procedure for the whole cell.

Advantageously, the performance can be increased compared to assuming the same, low, channel rank for the beam management procedure in the whole cell.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
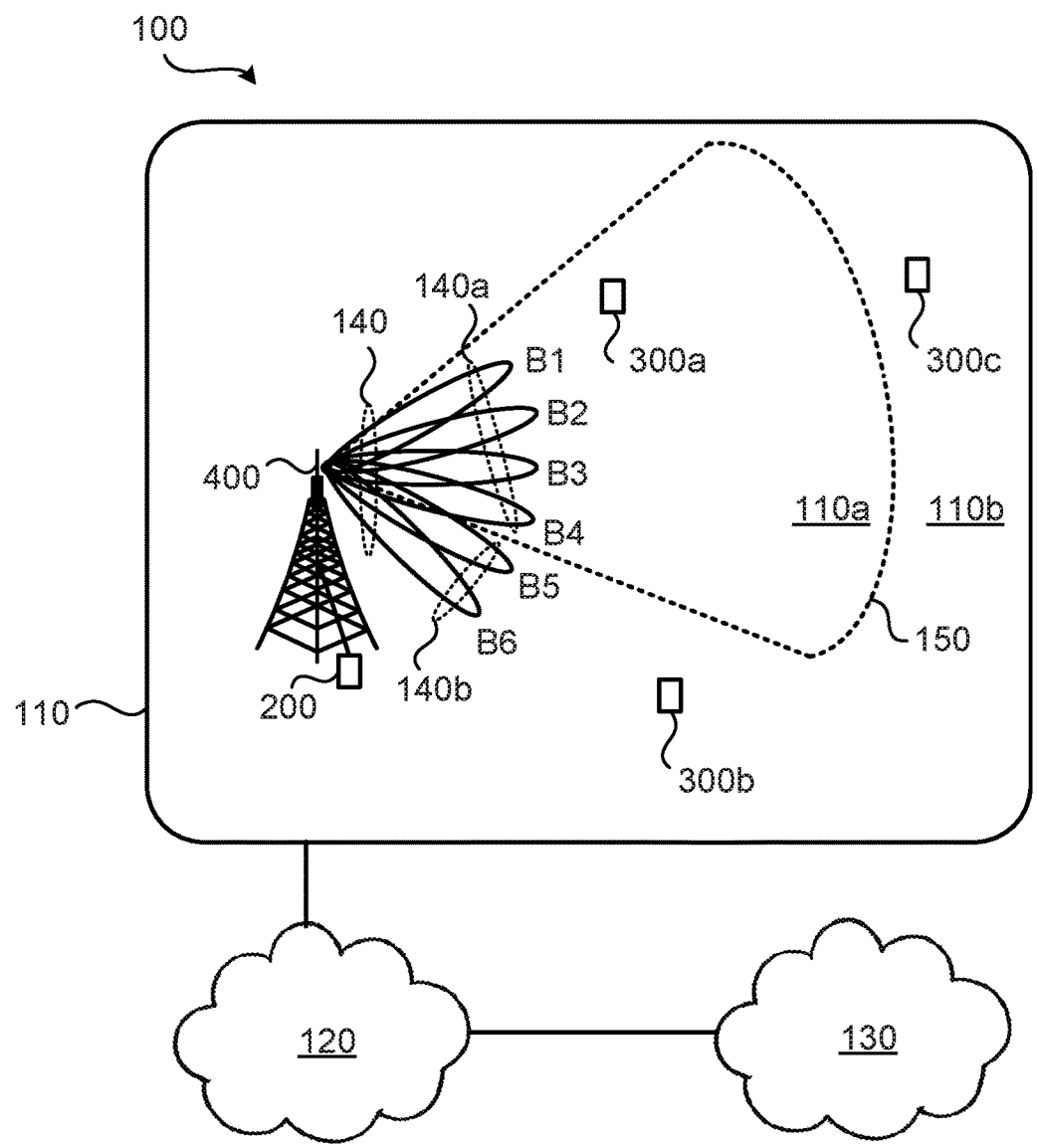
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications network 100 comprises a network node 200 that is configured to provide network access to terminal devices 300a, 300b, 300c in a cell 110 of a radio access network. The radio access network is operatively connected to a core network 120. The core network 120 is in turn operatively connected to a service network 130, such as the Internet. The terminal devices 300a, 300b, 300c are thereby, via the network node 200, enabled to access services of, and exchange data with, the service network 130. Examples of network nodes 200 are radio access network nodes, radio base stations, base transceiver stations, Node Bs, evolved Node Bs, g Node Bs, access points, and access nodes. Examples of terminal devices 300a, 300b, 300c are wireless devices, mobile stations, mobile phones, handsets, wireless local loop phones, user equipment (UE), smartphones, laptop computers, tablet computers, network equipped sensors, network equipped vehicles, and so-called Internet of Things devices.

In the illustrative example of FIG. 1 the network node 200 provides network access in the cell 110 by transmitting signals to, and receiving signals from, the terminal device 300a, 300b, 300c in beams B1, B2, B3, B4, B5, B6 belonging to a set of beams 140. The signals could be transmitted from, and received by, a TRP 400 of the network node 200. The TRP 400 could form an integral part of the network node 200 or be physically separated from the network node 200.

In general terms, the use of beamforming could imply that the terminal devices 300a, 300b, 300c will be not only operatively connected to the network node 200 via a beam but also performs a handover between (narrow) beams instead of between network nodes of different cells no. At higher frequency bands high-gain beamforming with narrow beams could be used due to more challenging radio propagation properties than at lower frequency bands. Each beam will only be optimal within a small area and the link budget outside the optimal beam will deteriorate quickly. Hence, frequent and fast beam switching is needed to maintain high performance. This is hereinafter referred to as beam management. One purpose of so-called beam management is thus for the network node 200 to keep track of its served terminal devices 300a, 300b, 300c with narrow beams (as used at the TRP 400 of the network node 200 and/or the terminal devices 300a, 300b, 300c) in order to increase coverage and throughput.

The terminal devices and/or the TRP of the network node could implement beamforming by means of analog beamforming, digital beamforming, or hybrid beamforming. Each implementation has its advantages and disadvantages.

In order to efficiently support high rank data transmission for cases with TRPs 400 and terminal devices 300a, 300b, 300c supporting four layers (typically with two antenna arrays at the TRP 400 and two antenna arrays at each terminal devices 300a, 300b, 300c), a beam management procedure is needed that can identify the best transmission beam of the TRP 400 based on not only received power, but also on other metrics such as channel rank, throughput etc. One way to achieve this is to use as many antenna ports as possible when transmitting reference signals in each candidate beam. Then, during beam sweeping of the beam management procedure, the terminal devices 300a, 300b, 300c receives the reference signals, one per beam, and evaluates, for example based on channel rank or user throughput, which beam or beams that was/were best. As used herein, the terms antenna port and layer (in the context of transmission layer, such as x-layer transmission, where x=2, 4, etc.) are related to each other, and the term antenna port is used when referring to beam management whereas the term layer is used when referring to data transmission.

For TRPs 400 and terminal devices 300a, 300b, 300c with four baseband chains each it might thus be advantageous to use four antenna ports during the beam management procedure in order to find the transmission beam(s) of the TRP 400 that maximize(s) the user throughput, or some other criterion. However, using four antenna ports during the beam management procedure requires more overhead compared to using a single antenna port or two antenna ports. One reason for this is that for two antenna ports, the two antenna arrays can evaluate two different beams simultaneously, which means that the beam management procedures can be performed twice as quick compared to when four antenna ports are used during the beam management procedure. Likewise, a beam management procedure using a single antenna port can be performed four times quicker due to the fact that four beams can be evaluated simultaneously, assuming that measurements on one polarization gives reliable beam selections.

Hence, is would be advantageous to, when four antenna ports for the beam management procedure are not needed (e.g. when the scenario only supports channel rank one or channel rank two transmissions), use a single antenna port or two antenna ports during the beam management procedure also when the TRP 400 and the terminal devices 300a, 300b, 300c have four baseband chains each.

The embodiments disclosed herein therefore relate to mechanisms for beam management in a cell 110. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a terminal device 300a, a method performed by the terminal device 300a, and a computer program product comprising code, for example in the form of a computer program, that when run on processing circuitry of the terminal device 300a, causes the terminal device 300a to perform the method.

Figure 2:
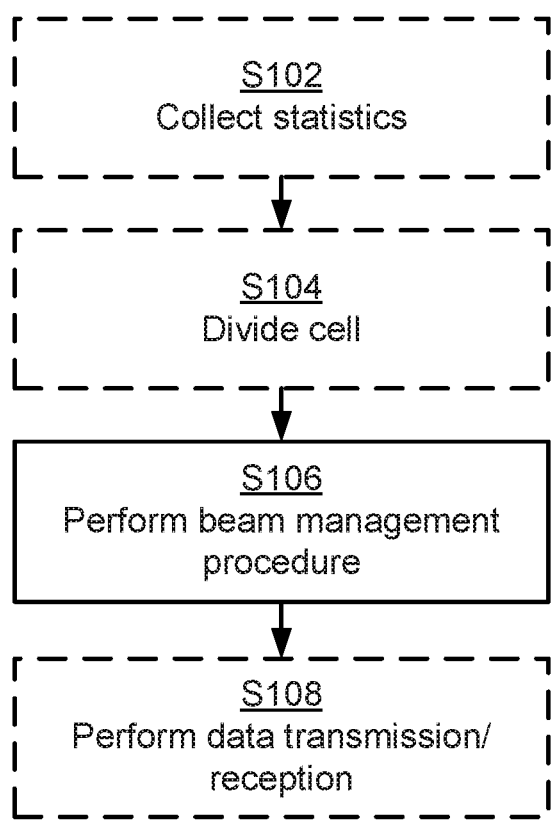
FIGS. 2 and 3 are flowcharts of methods according to embodiments.

Reference is now made to FIG. 2 illustrating a method for beam management in a cell 110 as performed by the network node 200 according to an embodiment. Continued reference is made to FIG. 1.

S106: The network node 200 performs a beam management procedure in a cell 110 served by the network node 200. A mutually different number of antenna ports are used by the network node 200 in each of at least two cell parts 110a, 110b into which the cell 110 is divided during the beam management procedure in the cell 110.

In FIG. 1 this is illustrated by the cell 110 having two cell parts 110a, 110b (divided by an imaginary boundary 150). During the beam management procedure in the cell 110, the number of antenna ports used by the network node 200 for terminal device 300a located in cell part 110a would thus be different from the number of antenna ports used for terminal devices 300b, 300c located in cell part 110b.

Embodiments relating to further details of beam management in a cell 110 as performed by the network node 200 will now be disclosed.

There may be different ways to determine how many antenna ports to be used by the network node 200. In some aspects the number of antenna ports to use by the network node 200 depends on the supported channel rank. According to an embodiment, which number of antenna ports to use in a respective one of the at least two cell parts 110a, 110b is dependent on which average channel rank is supported in this respective one of the at least two cell parts 110a, 110b. The number of antenna ports y could thus be a function $f$ of the average channel rank x. That is, if the average channel rank in cell part 110a is denoted x1, and the average channel rank in cell part 110*b* is denoted x2, then the number of antenna ports y1 to use in cell part 110*a* is a function of x1, and the number of antenna ports y2 to use cell part 110*b* is a function of x2. That is, y1=ƒ(x1) and y2=ƒ(x2).

There might be different criteria based on which the cell 110 is divided into the at least two cell parts 110*a*, 110*b*. In some aspects the cell 110 is divided into the at least two cell parts 110*a*, 110*b* based on channel rank. Particularly, according to an embodiment the cell 110 is divided into the at least two cell parts 110*a*, 110*b* based on statistics of the average channel rank estimated for terminal devices 300*a*, 300*b*, 300*c* served by the network node 200 in the cell 110.

In some aspects the network node 200 collects statistics of estimated channel rank for served terminal devices 300*a*, 300*b*, 300*c* in different parts of the cell 110. Thus, according to an embodiment the network node 200 is configured to perform (optional) step S102:

S102: The network node 200 collects the statistics (of the channel rank).

There could be different examples of such statistics. The statistics might be based on Channel State Information (CSI) reports from the terminal device 300*a*. Each CSI report could comprise a rank indicator (RI). The estimated channel rank could then be based on CSI reports from the terminal devices 300*a*, 300*b*, 300*c*, or uplink measurements on sounding reference signals. That is, the statistics might be based on uplink measurements performed by the network node 200 on Sounding Reference Signals (SRS) transmitted by the terminal devices 300*a*, 300*b*, 300*c*.

In some aspects statistics is not collected from all its served terminal devices 300*a*, 300*b*, 300*c*. Particularly, in some aspects, statistics is only collected for served terminal devices 300*a*, 300*b*, 300*c* supporting a certain minimum channel rank. As an example, a beam management procedure using at least four antenna ports will give the terminal devices 300*a*, 300*b*, 300*c* the possibility to adapt its panel beams based on highest estimated user throughput four up to four layers instead of only two layers, which most likely will result in different reception beams to be used by the terminal devices 300*a*, 300*b*, 300*c*, and hence increase user throughput, and correspondingly for the beams used by the TRP 400. Therefore, only those terminal devices 300*a*, 300*b*, 300*c* having more than two baseband chains, i.e. terminal devices 300*a*, 300*b*, 300*c* that support higher layer spatial multiplexing than two layers might be considered when collecting the statistics because for other terminal devices, a beam management procedure using channel rank four will not be needed. Particularly, according to an embodiment only statistics of those terminal devices 300*a*, 300*b*, 300*c* supporting at least channel rank four are considered when estimating the average channel rank. Which terminal devices 300*a*, 300*b*, 300*c* that support higher layer spatial multiplexing than two layers might be known to the network node 200 for example by means of capability signalling from the terminal devices 300*a*, 300*b*, 300*c*.

In general terms, the number of baseband chains at the terminal device 300*a*, 300*b*, 300*c* might affect the channel rank between the TRP 400 of the network node 200 and the terminal device 300*a*, 300*b*, 300*c*. Hence, in one embodiment, also the number of baseband chains is considered when dividing the cell 110 into the at least two cell parts 110*a*, 110*b*. The number of baseband chains comprised in the terminal devices 300*a*, 300*b*, 300*c* might be known to the network node 200 for example by means of capability signalling from the terminal devices 300*a*, 300*b*, 300*c*. Therefore, according to an embodiment, how high channel rank a respective one of the terminal devices 300*a*, 300*b*, 300*c* support is dependent on how many baseband chains this respective one of the terminal devices 300*a*, 300*b*, 300*c* comprise. For example, a cell part might be defined for terminal devices 300*a*, 300*b*, 300*c* with four baseband chains whereas another cell part might be defined for terminal devices 300*a*, 300*b*, 300*c* with six baseband chains.

In some aspects the rank depends on the geographical distance between the TRP 400 of the network node 200 and the terminal device 300*a*, 300*b*, 300*c*. Distance information, e.g. timing advance (TA), positioning data from a global positioning system (GPS), etc. might be used in order to determine the geographical distance. Thus, according to an embodiment the statistics further comprise positioning information of the terminal devices 300*a*, 300*b*, 300*c*. The cell 110 is then divided into the at least two cell parts 110*a*, 110*b* further based on the positioning information.

In some aspects also the traffic load is considered when dividing the cell 110 in to different cell parts 110*a*, 110*b*. The traffic load could be per beam in a beam-based network, such as in the illustrative communications network 100 of FIG. 1. Thus, according to an embodiment the cell 110 is divided into the at least two cell parts 110*a*, 110*b* based on traffic load in the cell 110. For example, if the traffic load is high, the signal to interference plus noise ratio (SINR) might not be high enough for 4-layer transmission, even if the channel has high rank (such as channel rank 4 or higher).

There could be different ways to accomplish the division of the cell 110 into the at least two cell parts 110*a*, 110*b*. The network node 200 might itself divides the cell 110 into different cell parts 110*a*, 110*b* based on the average channel rank in that area for the concerned terminal devices 300*a*, 300*b*, 300*c*. Thus, according to an embodiment the network node 200 is configured to perform (optional) step S104:

S104: The network node 200 divides the cell 110 into the at least two cell parts 110*a*, 110*b*.

Examples of how to divide the cell 110 into the at least two cell parts 110*a*, 110*b* based on the channel rank will now be disclosed.

According to a first example and a second example the cell 110 is divided into two cell parts 110*a*, 110*b*.

According to the first example the cell 110 is divided into two cell parts 110*a*, 110*b*. At most two antenna ports are used in a cell part supporting at most channel rank two, and three or four antenna ports are used in a cell part supporting at least channel rank three.

According to the second example the cell 110 is divided into two cell parts 110*a*, 110*b*, and at most three antenna ports are used in a cell part supporting at most channel rank three, and at least four antenna ports are used in a cell part supporting at least channel rank four.

According to a third example the cell 110 is divided into three cell parts 110*a*, 110*b*, 110*c*. According to the third example the cell 110 is divided into three cell parts 110*a*, 110*b*, 110*c*, and at most two antenna ports are used in a cell part supporting at most channel rank two, three or four antenna ports are used in a cell part supporting at least channel rank three and at most channel rank four, and at least five antenna ports are used in a cell part supporting at least channel rank five.

Although explicit examples only are given for two cell parts 110*a*, 110*b* and three cell parts 110*a*, 110*b*, 110*c*, respectively, the skilled person would understand how to divide the cell 110 into more than three parts in addition to other ways of how to divide the cell 110 into two or three cell parts 110*a*, 110*b*, 110*c*, respectively. For example, when channel rank 6 spatial multiplexing is supported by the network node 200, the cell 110 could be divided in to a first cell part 110a where two antenna ports are used for the beam management procedure, a second cell part 110b where four antenna ports are used for the beam management procedure, and a third cell part 110c where six antenna ports are used for the beam management procedure.

In general terms, a beam management procedure using two antenna ports would in many cases result in different beams than a beam management procedure using four antenna ports. For example, in case of two antenna ports are used, the terminal devices 300a, 300b, 300c are likely to select the beam that gives the highest received power (typically corresponding to the line of sight (LOS) path to the TRP 400), whilst in case four antenna ports are used, the terminal devices 300a, 300b, 300c are likely to select the beam that that creates a large amount of scattering around the terminal devices 300a, 300b, 300c (i.e. beams resulting in a high channel rank).

In some aspects, each cell part 110a, 110b corresponds to a subset of the beams 140. The different cell parts 110a, 110b could thus be defined by proper grouping of the beams 140. For example, the network node 200 could determine an average channel rank for each individual beam B1-B6 and then group the beams B1-B6 into two or more groups, where each group corresponds to one cell part 110a, 110b, based on the average channel ranks for all beam. Particularly, according to an embodiment the network node 200 serves the cell 110 in a set of beams 140, and each of the at least two cell parts 110a, 110b corresponds to a respective subset 140a, 140b of the set of beams 140. In the illustrative example of FIG. 1, a first subset 140a corresponding to cell part 110a includes beams B1-B4 whereas a second subset 140b corresponding to cell part 110b includes beams B5-B6.

In some aspects, all beams within a subset 140a, 140b of the set of beams 140 support a channel rank within a given interval. Particularly, according to an embodiment, an average channel rank is estimated for each beam, and all beams within each subset 140a, 140b have an average channel rank within an interval. The intervals of all subsets 140a, 140b are non-overlapping (and might be disjoint).

In some aspects, the intervals, and thus the subsets 140a, 140b of beams 140a, are divided by a respective threshold value. That is, according to an embodiment, each pair of such intervals is separated by a channel rank threshold value.

There could be different types of beam management procedures; the beam management procedure could pertain to beams in the downlink and/or for beams in the uplink. Particularly, according to an embodiment, during the beam management procedure, each respective beam is used for transmitting reference signals to terminal devices 300a, 300b, 300c served by the network node 200 and/or receiving reference signals from the terminal devices 300a, 300b, 300c.

Figure 4:
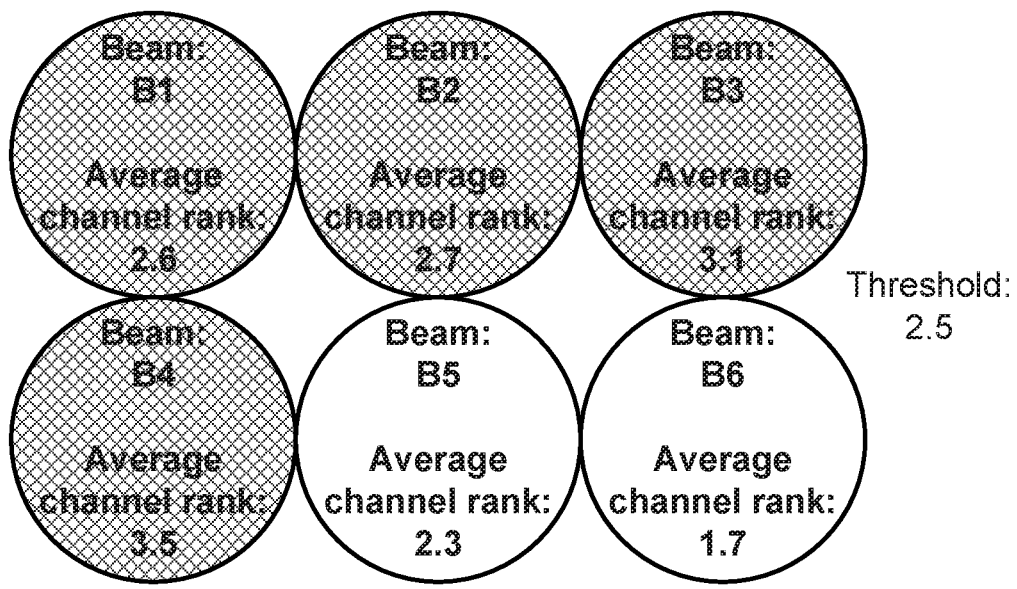
FIG. 4 is a schematic illustration of beams representing cell parts according to embodiments.
Figure 4:
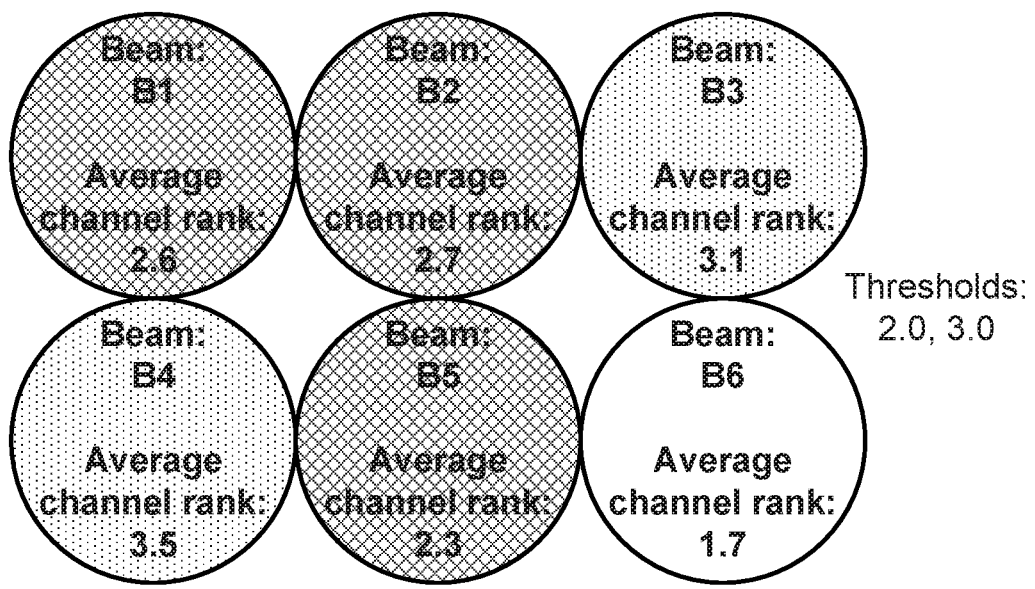
Figure 4:
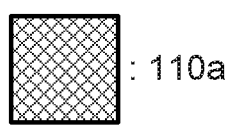
Figure 4:
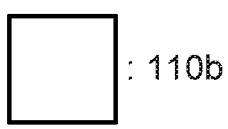
Figure 4:
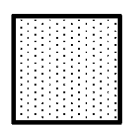

In some aspects, as in the illustrative example of FIG. 1, the network node 200 is configured for beamforming. Then the cell 110 could be divided into the at least two cell parts 110a, 100b by dividing the beams 140 into at least two subsets of beams. Particularly, according to an embodiment, dividing the cell no into the at least two cell parts 110a, 110b comprises determining, for each beam, which of the subsets 140a, 140b said each beam is to be a member of. Further details relating to dividing the beams 140 into at least two subsets of beams will be disclosed below with reference to FIG. 4.

There could be different purposes, or reasons, for performing the beam management procedure. In some aspects the beam management procedure is for discovering and maintaining beam pair links. That is, according to an embodiment the beam management procedure is performed in order to determine which beams 140 to use for those terminal devices 300a, 300b, 300c that are to be served in the cell 110 and/or to determine which beams 140 to use for those terminal devices 300a, 300b, 300c that already are served in the cell 110.

There could be different ways to perform the beam management procedure. In some aspects the beam management procedure involves transmitting and/or receiving reference signals, and receiving measurements of transmitted reference signals and/or making measurements on received reference signals. Particularly, according to an embodiment the beam management procedure involves transmitting reference signals to terminal devices 300a, 300b, 300c and/or receiving reference signals from the terminal devices 300a, 300b, 300c.

The number of antenna ports used during data transmission and/or reception might be different from the number of antenna ports used during the beam management procedure. In some aspects the actual data transmission and/or reception uses a higher number of antenna ports than the beam management procedure if the beam management procedure only uses 1 or 2 antenna ports. Particularly, according to an embodiment the network node 200 is configured to perform (optional) step S108:

S108: The network node 200 performs data transmission to and/or data reception from terminal devices 300a, 300b, 300c served by the network node 200 in the cell 110. A higher number of antenna ports is used by the network node 200 during the data transmission and/or data reception in at least one of the cell parts 110a, 110b than when performing beam management procedure in this at least one of the cell parts 110a, 110b.

In some aspects, although a single or two antenna ports are used for the beam management procedure in some cell parts, the network node 200 occasionally probes those cell parts using a higher number of antenna ports in order to determine whether the channel rank has increased. That is, according to an embodiment, at least for the cell part in which fewest antenna ports are used during the beam management procedure, more than the fewest antenna ports are occasionally used during the beam management procedure.

Figure 3:
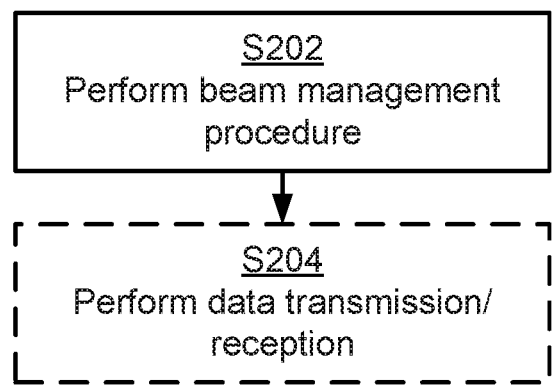

Reference is now made to FIG. 3 illustrating a method for beam management in a cell 110 as performed by the terminal device 300a according to an embodiment.

As disclosed above, the network node 200 performs a beam management procedure in a cell 110 served by the network node 200, where a mutually different number of antenna ports are used by the network node 200 in each of at least two cell parts 110a, 110b into which the cell 110 is divided during the beam management procedure in the cell 110. The terminal device 300a therefore performs an are-dependent beam management procedure within the cell 110. Particularly, the terminal device 300a is configured to perform step S202:

S202: The terminal device 300a performs a beam management procedure in the cell 110 served by the network node 200. As disclosed above, a mutually different number of antenna ports are used by the network node 200 in each of at least two cell parts 110a, 110b into which the cell 110 is divided during the beam management procedure in the cell 110. From how many antenna ports at the network node 200 the terminal device 300a receives reference signals during the beam management procedure thereby depends on in which of the at least two cell parts 110a, 110b the terminal device 300a is located during the beam management procedure.

Embodiments relating to further details of beam management in a cell 110 as performed by the terminal device 300a will now be disclosed.

As disclosed above, in some aspects the actual data transmission uses higher rank than when the beam management procedure only uses rank 1 or 2. Thus, according to an embodiment the terminal device 300a is configured to perform (optional) step S204:

S204: The terminal device 300a performs data transmission to and/or data reception from the network node 200 in the cell 110. A higher number of antenna ports are used by the network node 200 during the data transmission and/or data reception in at least one of the cell parts 110a, 110b than when performing the beam management procedure in this at least one of the cell parts 110a, 110b.

As disclosed above, in some aspects the cell 110 could be divided into the at least two cell parts 110a, 100b by dividing the beams 140 into at least two subsets of beams. FIG. 4(a) shows a schematic illustration of beams of a cell divided into two different subsets of beams, where each subset corresponds to its own cell part 110a, 110b, and FIG. 4(b) shows a schematic illustration of beams of a cell divided in to three different subsets of beams, where each subsets corresponds to its own cell part 110a, 110b, 110c. For each beam B1-B6 is given the statistical average channel rank of those terminal devices 300a, 300b, 300c with more than two baseband chains that are served by the network node 200 in each beam. In FIG. 4(a), depending on if the average channel rank is over or below 2.5, two or four antenna ports are used for the beam management procedure for each beam. In FIG. 4(b) there are two such thresholds, set at 2.0 and 3.0. For the beam management procedure, a single antenna port is used for those beams where the average channel rank is below 2.0, two antenna ports are used for those beams where the average channel rank is at least 2.0 but less than 3.0, and three antenna ports are used for those beams where the average channel rank at least 3.0.

Figure 5:
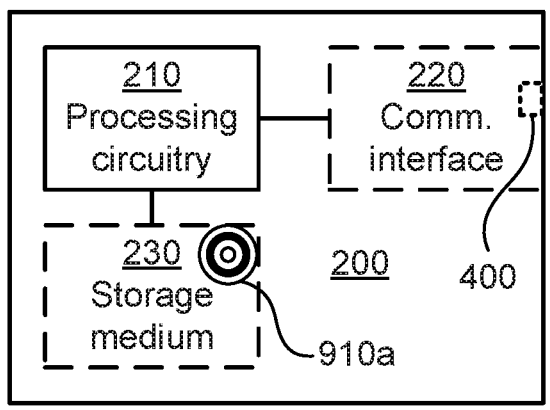
FIG. 5 is a schematic diagram showing functional units of a network node according to an embodiment.

FIG. 5 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S108, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, nodes, functions, and devices of the communications network 100. As such the communications interface 220 may comprise one or more transmitters and receivers, comprising analogue and digital components. Signals could be transmitted from, and received by, a TRP 400 of the network node 200. The TRP 400 could form an integral part of the network node 200 or be physically separated from the network node 200. The communications interface 220 might thus optionally comprise the TRP 400.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 6:
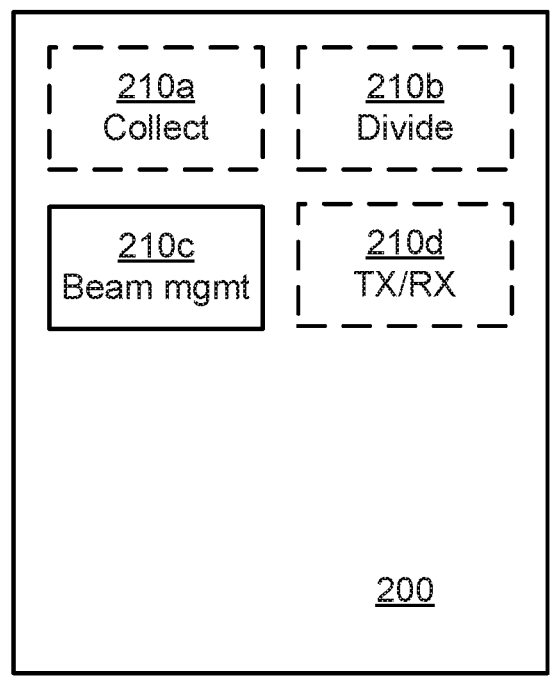
FIG. 6 is a schematic diagram showing functional modules of a network node according to an embodiment.

FIG. 6 schematically illustrates, in terms of a number of functional modules, the components of a network node 200 according to an embodiment. The network node 200 of FIG. 6 comprises a beam management module 210C configured to perform step S106. The network node 200 of FIG. 6 may further comprise a number of optional functional modules, such as any of a collect module 210a configured to perform step S102, a divide module 210b configured to perform step S104, and a transmit/receive module 210d configured to perform step S108. In general terms, each functional module 210a-210d may be implemented in hardware or in software. Preferably, one or more or all functional modules 210a-210d may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210d and to execute these instructions, thereby performing any steps of the network node 200 as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. In this respect, at least part of the network node 200 may reside in the radio access network, such as in the radio access network node, for cases when embodiments as disclosed herein are performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 5, the processing circuitry 210 may be distributed among a plurality of devices, or nodes. The same applies to the functional modules 210a-210d of FIG. 6 and the computer program 920a of FIG. 9 (see below).

Figure 7:
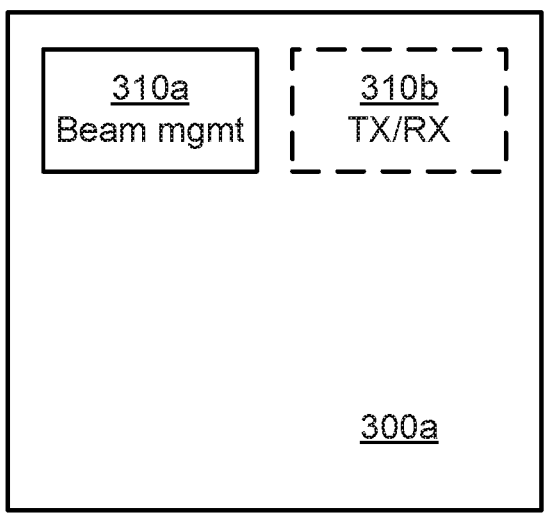
FIG. 7 is a schematic diagram showing functional units of a terminal device according to an embodiment.

FIG. 7 schematically illustrates, in terms of a number of functional units, the components of a terminal device 300a according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the terminal device 300a to perform a set of operations, or steps, S202-S204, as disclosed above. For example, the storage medium 330 may store the set of operations, and the processing circuitry 310 may be configured to retrieve the set of operations from the storage medium 330 to cause the terminal device 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The terminal device 300a may further comprise a communications interface 320 for communications with other entities, nodes, functions, and devices of the communications network 100. As such the communications interface 320 may comprise one or more transmitters and receivers, comprising analogue and digital components.

The processing circuitry 310 controls the general operation of the terminal device 300a e.g. by sending data and control signals to the communications interface 320 and the storage medium 330, by receiving data and reports from the communications interface 320, and by retrieving data and instructions from the storage medium 330. Other components, as well as the related functionality, of the terminal device 300a are omitted in order not to obscure the concepts presented herein.

Figure 8:
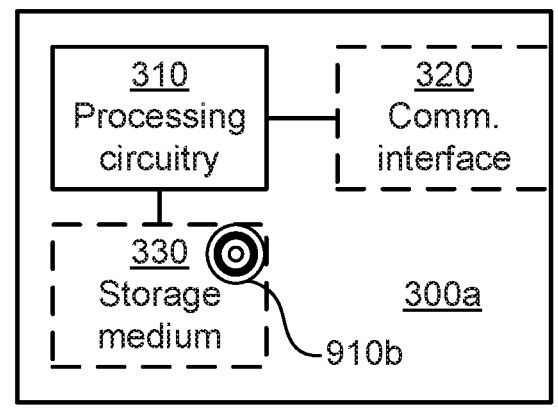
FIG. 8 is a schematic diagram showing functional modules of a terminal device according to an embodiment.

FIG. 8 schematically illustrates, in terms of a number of functional modules, the components of a terminal device 300a according to an embodiment. The terminal device 300a of FIG. 8 comprises a beam management module 310a configured to perform step S202. The terminal device 300a of FIG. 8 may further comprise a number of optional functional modules, such as a transmit/receive module 310b configured to perform step S204. In general terms, each functional module 310a-310b may be implemented in hardware or in software. Preferably, one or more or all functional modules 310a-310b may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310b and to execute these instructions, thereby performing any steps of the terminal device 300a as disclosed herein.

Figure 9:
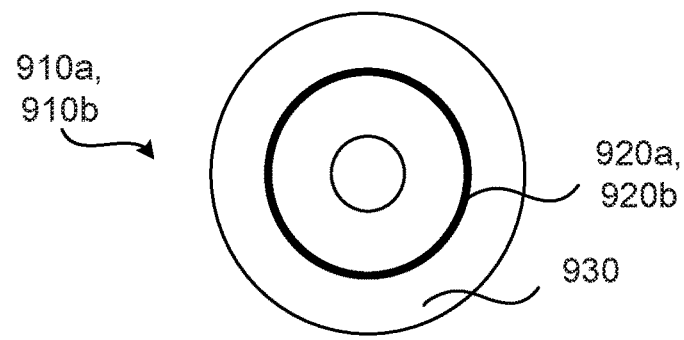
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the network node 200 as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the terminal device 300a as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam management in a cell, the method comprising:
    determining a first channel rank value that denotes a channel rank supported in a first part of the cell;
    determining a second channel rank value that denotes a channel rank supported in a second part of the cell, wherein the first part of the cell is different from the second part of the cell;
    determining a first number of antenna ports for the first part of the cell based on the determined first channel rank value;
    determining a second number of antenna ports for the second part of the cell based on the determined second channel rank value;
    using the first number of antenna ports in the first part of the cell during a beam management procedure;
    using the second number of antenna ports in the second part of the cell during the beam management procedure; and
    performing data transmission to and/or data reception from terminal devices served by a network node in the cell, wherein a number of antenna ports used by the network node in a part of the cell during the data transmission and/or the data reception is higher than a number of antenna ports used by the network node in said part of the cell during the beam management procedure.

2. The method of claim 1, wherein the cell is divided into at least two parts including the first part and the second part based on statistics of average channel rank estimated for the terminal devices served by the network node in the cell.

3. The method of claim 2, further comprising: collecting said statistics.

4. The method of claim 2, wherein the statistics are based on Channel State Information (CSI) reports from the terminal devices or on uplink measurements performed by the network node on Sounding Reference Signals (SRS) transmitted by the terminal devices.

5. The method of claim 2, wherein only statistics of those terminal devices supporting at least channel rank four are considered when estimating the average channel rank.

6. The method of claim 2, wherein a channel rank supported by a respective one of the terminal devices depends on a number of baseband chains included in said respective one of the terminal devices.

7. The method of claim 2, wherein
the statistics further comprise positioning information of the terminal devices, and
the cell is divided into the at least two parts further based on said positioning information.

8. The method of claim 1, wherein the cell is divided into at least two parts including the first part and the second part based on traffic load in the cell.

9. The method of claim 1, wherein
the cell is divided into the first part and the second part,
at most two antenna ports are used in the first part supporting at most channel rank two, and
three or four antenna ports are used in the second part supporting at least channel rank three.

10. The method of claim 1, wherein
the cell is divided into the first part and the second part,
at most three antenna ports are used in the first part supporting at most channel rank three, and
at least four antenna ports are used in the second part supporting at least channel rank four.

11. The method of claim 1, wherein
the cell is divided into three parts including the first part, the second part, and a third part,
at most two antenna ports are used in the first part supporting at most channel rank two,
three or four antenna ports are used in the second part supporting at least channel rank three and at most channel rank four, and
at least five antenna ports are used in the third part supporting at least channel rank five.

12. The method of claim 1, wherein the network node serves the cell in a set of beams,
the first part of the cell corresponds to a first subset of beams in the set of beams, and
the second part of the cell corresponds to a second subset of beams in the set of the beams.

13. The method of claim 12, wherein
the first subset of beams includes beams within a first range of average channel rank,
the second subset of beams includes beams within a second range of average channel rank, and
the first range and the second range do not overlap.

14. The method of claim 13, wherein the first range and the second range are separated by a channel rank threshold value.

15. The method of claim 12, wherein, during the beam management procedure, the set of beams is for transmitting reference signals to terminal devices served by the network node or for receiving reference signals from the terminal devices.

16. The method of claim 12, wherein the cell is divided into at least two parts including the first part and the second part based on determining whether a beam belongs to the first subset or the second subset.

17. The method of claim 1, wherein the beam management procedure is performed in order to determine which beams to use for terminal devices to be served in the cell and to determine which beams to use for terminal devices already served in the cell.

18. The method of claim 1, wherein the beam management procedure involves transmitting reference signals to the terminal devices and/or receiving reference signals from the terminal devices.

19. The method of claim 1, further comprising:
increasing a number of antenna ports used for the beam management procedure to determine a change in a part of the cell.

20. A method for beam management in a cell, the method comprising:
determining a first channel rank value that denotes a channel rank supported in a first part of the cell;
determining a second channel rank value that denotes a channel rank supported in a second part of the cell, wherein the first part of the cell is different from the second part of the cell;
determining a first number of antenna ports for the first part of the cell based on the determined first channel rank value;
determining a second number of antenna ports for the second part of the cell based on the determined second channel rank value;
using the first number of antenna ports in the first part of the cell during a beam management procedure; and
using the second number of antenna ports in the second part of the cell during the beam management procedure, wherein
determining the first channel rank value comprises determining a first average channel rank for the first part of the cell, and
determining the second channel rank value comprises determining a second average channel rank for the second part of the cell.

21. A method for beam management in a cell, the method being performed by a terminal device, the method comprising:
performing a beam management procedure in a cell served by a network node, and
performing data transmission to and/or data reception from the network node in the cell, wherein a number of antenna ports used by the network node in a part of the cell during the data transmission or the data reception is higher than a number of antenna ports used by the network node in said part of the cell during the beam management procedure, wherein
the cell is divided into at least two parts including a first part and a second part,
a first number of antenna ports is used in the first part of the cell during the beam management procedure,
a second number of antenna ports is used in the second part of the cell during the beam management procedure, and
a number of antenna ports at the network node from which the terminal device receives reference signals during the beam management procedure is determined based on whether the terminal device is located in the first part or the second part, and one of a first channel rank value that denotes a channel rank supported in the first part and a second channel rank value that denotes a channel rank supported in the second part.

22. The method of claim 21, wherein the cell is divided into said at least two parts including the first part and the second part based on statistics of average channel rank estimated for terminal devices served by the network node in the cell.

23. A network node for beam management in a cell, the network node comprising processing circuitry, the processing circuitry being configured to cause the network node to:
determine a first channel rank value that denotes a channel rank supported in a first part of the cell;
determine a second channel rank value that denotes a channel rank supported in a second part of the cell, wherein the first part of the cell is different from the second part of the cell;
determine a first number of antenna ports for the first part of the cell based on the determined first channel rank value;
determine a second number of antenna ports for the second part of the cell based on the determined second channel rank value;
use the first number of antenna ports in the first part of the cell during a beam management procedure;
use the second number of antenna ports in the second part of the cell during the beam management procedure; and
perform data transmission to and/or data reception from terminal devices served by a network node in the cell, wherein a number of antenna ports used by the network node in a part of the cell during the data transmission and/or the data reception is higher than a number of antenna ports used by the network node in said part of the cell during the beam management procedure.

24. The network node of claim 23, further comprising a non-transitory storage medium coupled to the processing circuitry, wherein the non-transitory storage medium stores instructions for configuring the processing circuitry to perform the beam management procedure.

25. The terminal device of claim 23, further comprising a non-transitory storage medium coupled to the processing circuitry, wherein the non-transitory storage medium stores instructions for configuring the processing circuitry to perform the beam management procedure.

26. A terminal device for beam management in a cell, the terminal device comprising processing circuitry, the processing circuitry being configured to cause the terminal device to:
perform a beam management procedure in a cell served by a network node, and
perform data transmission to and/or data reception from the network node in the cell, wherein a number of antenna ports used by the network node in a part of the cell during the data transmission or the data reception is higher than a number of antenna ports used by the network node in said part of the cell during the beam management procedure, wherein
the cell is divided into at least two parts including a first part and a second part,
a first number of antenna ports is used in the first part of the cell during the beam management procedure,
a second number of antenna ports is used in the second part of the cell during the beam management procedure, and
a number of antenna ports at the network node from which the terminal device receives reference signals during the beam management procedure is determined based on whether the terminal device is located in the first part or the second part, and one of a first channel rank value that denotes a channel rank supported in the first part and a second channel rank value that denotes a channel rank supported in the second part.

27. A computer program product comprising a non-transitory computer readable medium storing a computer program for beam management in a cell, the computer program comprising computer code which, when run on processing circuitry of a network node, causes the network node to:
determine a first channel rank value that denotes a channel rank supported in a first part of the cell;
determine a second channel rank value that denotes a channel rank supported in a second part of the cell, wherein the first part of the cell is different from the second part of the cell;
determine a first number of antenna ports for the first part of the cell based on the determined first channel rank value;
determine a second number of antenna ports for the second part of the cell based on the determined second channel rank value;
use the first number of antenna ports in the first part of the cell during a beam management procedure;
use the second number of antenna ports in the second part of the cell during the beam management procedure; and
perform data transmission to and/or data reception from terminal devices served by a network node in the cell, wherein a number of antenna ports used by the network node in a part of the cell during the data transmission and/or the data reception is higher than a number of antenna ports used by the network node in said part of the cell during the beam management procedure.

28. A computer program product comprising a non-transitory computer readable medium storing a computer program for beam management in a cell, the computer program comprising computer code which, when run on processing circuitry of a terminal device, causes the terminal device to:
perform a beam management procedure in a cell served by a network node, and
perform data transmission to and/or data reception from the network node in the cell, wherein a number of antenna ports used by the network node in a part of the cell during the data transmission or the data reception is higher than a number of antenna ports used by the network node in said part of the cell during the beam management procedure, wherein
the cell is divided into at least two parts including a first part and a second part,
a first number of antenna ports is used in the first part of the cell during the beam management procedure,
a second number of antenna ports is used in the second part of the cell during the beam management procedure, and
a number of antenna ports at the network node from which the terminal device receives reference signals during the beam management procedure is determined based on whether the terminal device is located in the first part or the second part, and one of a first channel rank value that denotes a channel rank supported in the first part and a second channel rank value that denotes a channel rank supported in the second part.

29. A method for beam management in a cell, the method being performed by a terminal device, the method comprising:
- performing a beam management procedure in a cell served by a network node, wherein
- the cell is divided into at least two parts including a first part and a second part,
- a first number of antenna ports is used in the first part of the cell during the beam management procedure,
- a second number of antenna ports is used in the second part of the cell during the beam management procedure, and
- a number of antenna ports at the network node from which the terminal device receives reference signals during the beam management procedure is determined based on whether the terminal device is located in the first part or the second part, and one of a first channel rank value that denotes a channel rank supported in the first part and a second channel rank value that denotes a channel rank supported in the second part,
- the channel rank supported in the first part is a first average channel rank for the first part of the cell, and
- the channel rank supported in the second part is a second average channel rank for the second part of the cell.

* * * * *